United States Patent [19]
Adamek et al.

[11] Patent Number: 5,702,306
[45] Date of Patent: Dec. 30, 1997

[54] PROTECTIVE DEVICE FOR TELESCOPIC SHAFTS

[75] Inventors: Wolfgang Adamek, Lohmar; Horst Kretschmer, Köln; Hubert Grosse Entrup, Lohmar; Clemens Nienhaus, Neunkirchen-Seelscheid; Paul Herchenbach, Ruppichteroth; Andreas Sarfert, Bonn; Klaus Kämpf, Lohmar; Wilhelm Schott, Köln, all of Germany

[73] Assignee: GKN Walterscheid GmbH, Lohmar, Germany

[21] Appl. No.: 743,322

[22] Filed: Nov. 4, 1996

[30] Foreign Application Priority Data

Nov. 4, 1995 [DE] Germany ............... 195 41 155.2

[51] Int. Cl.⁶ ........................................... F16C 1/26
[52] U.S. Cl. ........................................ 464/172; 464/183
[58] Field of Search .................. 180/53.1; 280/240; 74/608, 609; 464/170, 172, 179, 180

[56] References Cited

U.S. PATENT DOCUMENTS

| | | | |
|---|---|---|---|
| 1,784,436 | 12/1930 | Hadley | 464/183 X |
| 2,923,140 | 2/1960 | Weasler | 464/172 X |
| 2,953,000 | 9/1960 | Ressler et al. | 464/172 |
| 3,108,457 | 10/1963 | Weasler | |
| 3,113,441 | 12/1963 | Weasler | 464/172 |
| 4,473,361 | 9/1984 | Geisthoff et al. | 464/172 |
| 4,622,022 | 11/1986 | Diffenderfer et al. | 464/183 X |

FOREIGN PATENT DOCUMENTS

| | | | |
|---|---|---|---|
| 34618 | 1/1965 | German Dem. Rep. | |
| 43294 | 11/1965 | German Dem. Rep. | |
| 39 16 748 A1 | 11/1990 | Germany | |
| 876593 | 9/1961 | United Kingdom | 464/172 |
| 2102915 | 2/1983 | United Kingdom | |

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

A protective device for telescopic driveshafts used in driving agricultural implements has two protective tubes (8, 9) which are axially inserted into, and overlap, one another. The tubes (8, 9) are adjustable relative to one another along their longitudinal axis (5) and are made of plastics. The outer protective tube (8) includes three circumferentially distributed pairs of ribs (13, 14). The ribs (13, 14) are arranged at a distance from one another and a groove (11) is formed between the ribs (13, 14). Guiding webs (15) are provided between pairs of ribs (13, 14). The webs (15) project inwardly towards the longitudinal axis (5) from the inner face (12) of the outer protective tube (8). The webs (15) also project inwardly towards the longitudinal axis (5) and serve to center and radially support the tube (9). The outer face of the outer protective tube has a smooth finish. Thus, there are no projections which may possibly injure the operative when unintentionally rotating the protective device.

5 Claims, 2 Drawing Sheets

PROTECTIVE DEVICE FOR TELESCOPIC SHAFTS

BACKGROUND OF THE INVENTION

The invention relates to a protective device for telescopic, rotating shafts, especially driveshafts used in driving, or in drivelines of, agricultural implements. The driveshafts include two protective tubes which are axially inserted into, and overlap, one another. The tubes are adjustable relative to one another in the direction of their longitudinal axis. The tubes are made of plastics. The tubes include an outer and an inner protective tube. At least one tube includes a groove extending parallel to the longitudinal axis. The other tube includes at least one guiding rib which extends parallel to the longitudinal axis. The groove and rib engage one another.

A protective device is described in DE 39 16 748 C2. It has been found that the inwardly directed ribs and indentations arranged within the wall thickness do not effect a sufficiently large, non-rotating condition. Thus, a relative rotation between the inner and outer protective tube can still occur.

SUMMARY OF THE INVENTION

It is an object of the invention to provide a protective device which, between the inner and the outer protective tube, achieves a non-rotating connection meeting the respective requirements. Furthermore, it is an object that the connection ensures the lowest possible amount of friction along the axial path of adjustment when radial loads are applied.

In accordance with the invention, the outer protective tube, on its inner face, includes at least three grooves. The grooves are open towards the longitudinal axis and are delimited by pairs of ribs of the outer protective tube. The ribs extend parallel relative to the longitudinal axis and project from the inner face. The pairs of ribs are arranged so as to be distributed on the circumference of the inner face around the longitudinal axis. The outer protective tube, on its inner face, between the pairs of ribs, includes at least one guiding web projecting from the inner face towards the longitudinal axis. The inner protective tube includes guiding ribs which project radially outwardly from its outer face. The number of guiding ribs correspond to the number of pairs of ribs of the outer protective tube. The guiding ribs are arranged and distributed accordingly. The guiding ribs, in each case, engage, with play, the region between a pair of ribs in the circumferential direction and radial direction. The ribs and guiding webs are formed on the outer protective tube and the guiding ribs are formed on the inner protective tube.

An advantage is that a sufficiently large, non-rotating connection can be achieved by the pairs of ribs provided at the outer protective tube engaging the guiding ribs of the inner protective tube. Furthermore, the guiding webs ensure small contact faces between the inner protective tube and the outer protective tube. This achieves a sufficiently long centering distance, on the one hand, and low friction values, on the other hand. The two protective tubes are easily adjustable relative to one another in the direction of the longitudinal axis. Furthermore, the circumferential distance, in the form of play, between the ribs and the guiding rib ensures that jamming does not occur. In the case of excessive radial loads, the ribs and guiding rib additionally ensure that the two protective tubes are sufficiently supported relative to one another, thus, maintaining their accident preventing function. Furthermore, since the ribs of the outer protective tube project from the inner face, it is possible to achieve a virtually smooth outer surface. The smooth outer surface offers effective winding protection and thus little risk of injury when touched by an operative, for instance the tractor driver. Winding protection is achieved by the shape which ensures that if the operative forgets to secure the protective device against rotation, by attaching it to a fixed point of the tractor with the protective device acting as a stationary guard, the operative's clothes cannot be wound up by the tubes. Normally, such protective devices act as a stationary guard by being attached to a fixed point of the implement by a chain, rope or the like. The ribs and the guiding rib per pair ensure that the protective tubes and the protective cone connected thereto are effectively secured against rotation.

The ribs and the guiding ribs as well as the guiding webs can be produced directly while extruding the protective tubes. Also, the guiding ribs, ribs and webs can be formed during a partial stage of the production process. The material for such tubes is preferably HDPE, a high-density polyethylene.

According to a further embodiment of the invention, the inner protective tube, with the exception of the projecting guiding ribs, has an annular cross-section.

Two variants are provided for the outer protective tube. According to a first variant, the outer protective tube, with the exception of the ribs and guiding webs, has an annular cross-section. The guiding webs are longer than the ribs.

According to a preferred embodiment, in the region of the pairs of ribs of the outer protective tube, the distance between the inner face of the outer protective tube and the outer face of the inner protective tube is greater than in the region of the guiding webs. Also, the wall of the outer protective tube, in the wall portion, between two pairs of ribs, includes an arched cross-section whose curvature is smaller than the wall portion in the region of the pairs of ribs.

It is particularly advantageous to achieve a smooth surface without any projections. Also, at the same time, it is advantageous to minimize the space relative to the inner tube in order to reduce the possibility of dirt penetration.

For both variants, the guiding webs, via their web ends, serve as spacers for the outer protective tube with the ribs relative to the outer face of the inner protective tube. The guiding webs also serve as spacers for the end faces of the guiding ribs to the inner face portion of the outer protective tube between the two ribs of the respective pair of ribs.

BRIEF DESCRIPTION OF THE DRAWINGS

Two preferred embodiments of the invention and their application in a protective device of a driveshaft are diagrammatically illustrated in the drawing and described below in greater detail.

DETAILED DESCRIPTION OF THE DRAWINGS

Figure 1:
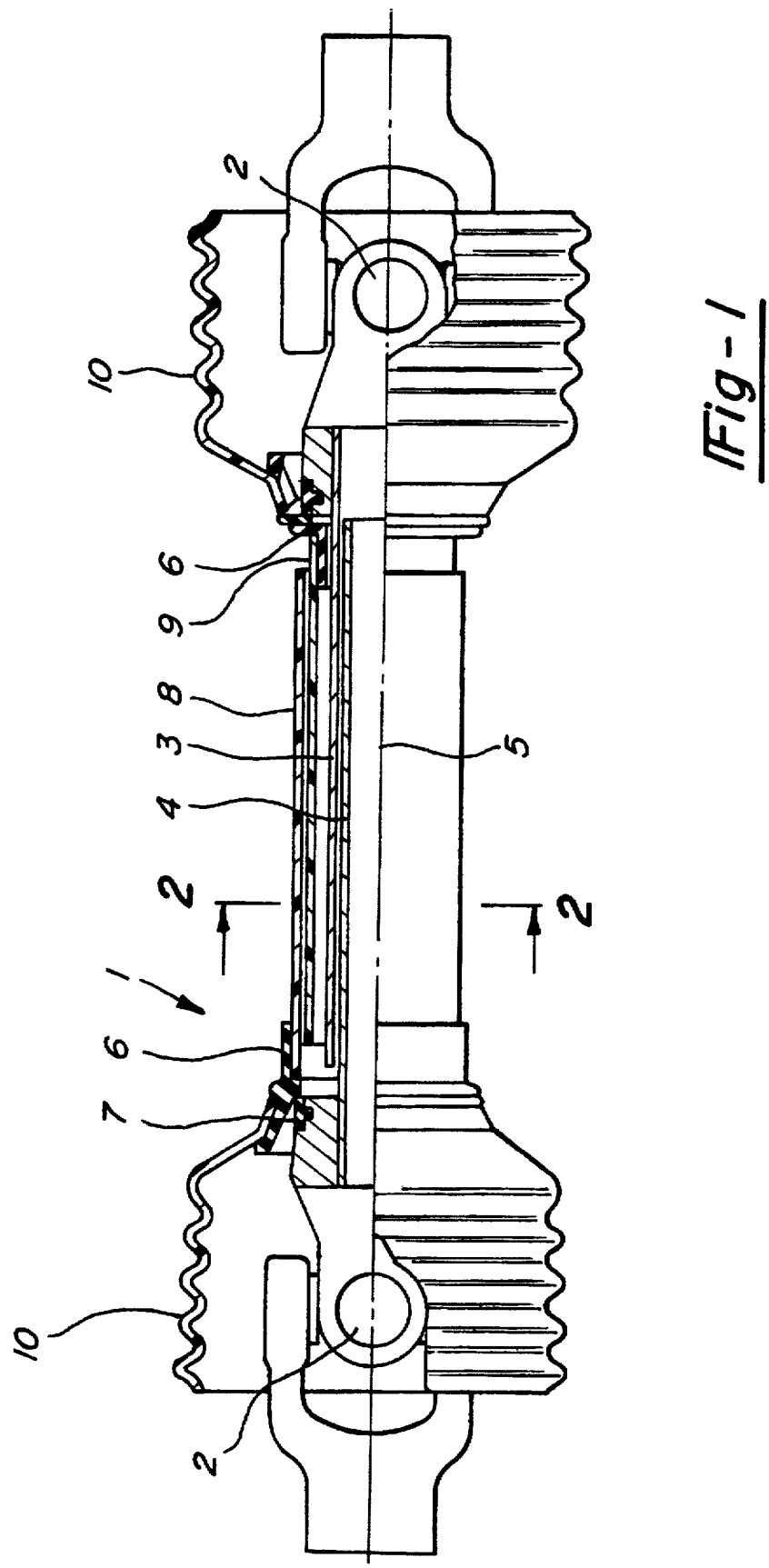
FIG. 1 is a longitudinal section view through an agricultural driveshaft.

FIG. 1 shows a driveshaft 1 which serves, for example, for driving an agricultural implement via the power take-off shaft of a tractor. The two ends of the shaft are provided with universal joints 2. One of the universal joints includes a joint yoke to connect with the power take-off shaft. The other end includes a joint yoke to connect with the driveshaft of the agricultural implement. The profiled tubes 3, 4 are non-rotatingly, but longitudinally adjustably connected to one another. Thus, torque can be transmitted between the two connecting yokes of the joints 2. Additionally, the distance between the two joints can be changed.

The outer profiled tube 3 is connected to the inner joint yoke of one of the two joints 2. The righthand joint 2, shown in FIG. 1, is connected to the tube 3 whereas the inner profiled tube 4, inserted into the outer profiled tube 3, is connected to the lefthand joint 2. The two profiled tubes 3, 4 include a cross-section which deviates from a circular cross-section. The tubes have the shape of a two rib tube which enables transmission of torque between the two joints 2. To be able to change the length between the two joints 2, the two profiled tubes 3, 4 are slidable into one another along the longitudinal axis 5.

Each of the two inner joint yokes of the joints 2 is associated with a bearing ring 7 which is rotatably received in a groove of the inner joint yoke. The connecting cap 6 associated with the joint 2, shown on the lefthand side of FIG. 1, serves to secure and center the outer protective tube 8 and a protective cone 10. The connecting cap 6 associated with the joint 2, shown on the righthand side of FIG. 1, serves to center and secure the inner protective tube 9. The inner protective tube 9 slidably enters the outer protective tube 8 along the longitudinal axis 5. FIG. 1 shows the driveshaft 1 in its shortened position. Starting from this position, the two joints 2 can be moved away from one another, with the two profiled tubes 3, 4 and the two protective tubes 8, 9 also carrying out a relative movement relative to one another along the longitudinal axis.

The righthand joint 2 is also associated with a protective cone 10 which is attached to the connecting cap 6 associated with the joint. The two protective tubes 8, 9 have a contact preventing function for an operative. The tubes 8, 9 are stationary while the driveshaft rotates around the longitudinal axis 5. Thus, only the joints 2 and the two profiled tubes 3, 4 rotate.

Figure 2:
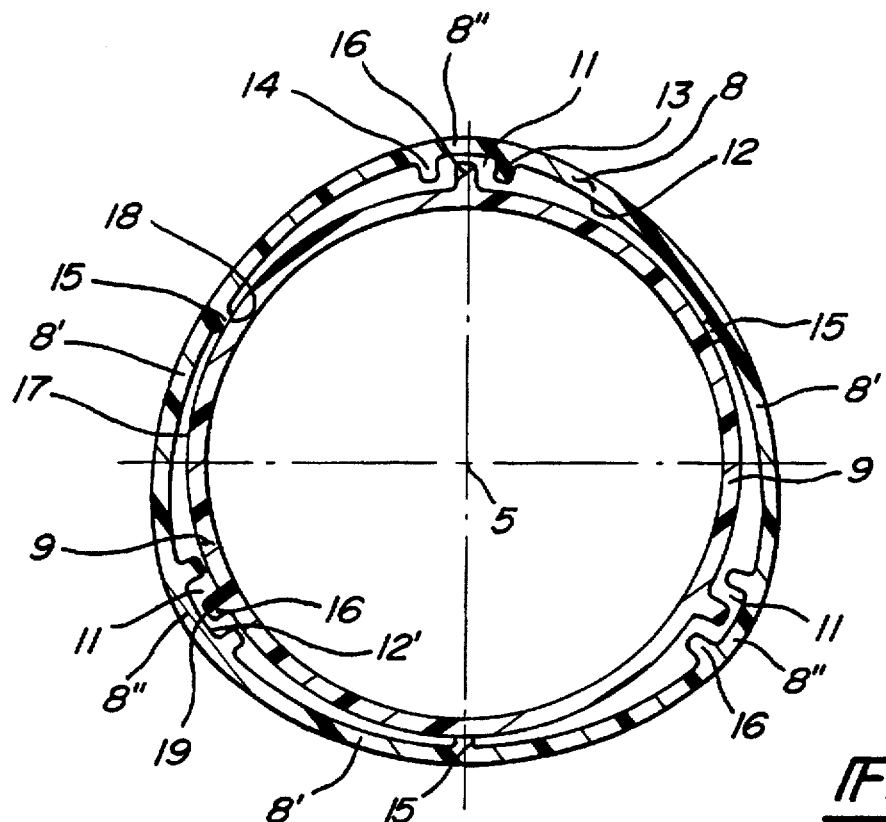
FIG. 2 is a cross-section view along line 2—2 of FIG. 1.

FIG. 2 shows a cross-section through the inner and outer protective tubes 8, 9 according to sectional line II—II of FIG. 1. The two profiled tubes 3, 4 are not shown. This embodiment constitutes a preferred embodiment. The outer protective tube 8 includes three pairs of circumferentially distributed ribs 13, 14. The ribs 13, 14 project from the inner face 12 of the tube towards the longitudinal axis 5. Grooves 11 are formed between two ribs 13, 14 of each pair of ribs. In the region between the two ribs 13, 14 of each pair of ribs, the inner face 12 of the outer protective tube 8 has been given the reference numeral 12'. Approximately in the center, the wall portion 8' between two circumferentially adjoining pairs of ribs 13, 14 includes a guiding web 15.

The web 15 projects radially inwardly towards the longitudinal axis 5 and ends at its web end 18. The web end 18 is the face which is positioned opposite the outer face 17 of the inner protective tube 9. The web end 18 serves to support the outer protective tube 8 on the inner protective tube 9. The web 15 centers the inner protective tube 9 in the outer protective tube 8.

The inner protective tube 9 includes an overall annular cross-section. The guiding ribs 16 project radially outwardly from the outer face 17 of the tube 9. The guiding ribs 16 are distributed in accordance with the grooves 11. The guiding ribs 16, with circumferential and radial play, engage the region between the spaced ribs 13, 14 of each pair of ribs. The end faces 19 of the guiding ribs 16 are arranged at a distance from the inner face portion 12' between the two ribs 13, 14. A distance also exists between the end faces of the ribs 13, 14 and the outer face 17 of the inner protective tube 9.

It can also be seen that, in the region between the pairs of ribs 13, 14, the outer protective tube 8 includes a wall portion 8'. The wall portion 8' includes a curvature which is smaller than that of the wall portion 8" between two ribs 13, 14 of a pair of ribs, relative to the curvature of the wall of the inner protective tube 9. This means that in the region of the wall portion 8" of the outer protective tube 8, which wall portion 8" includes the ribs 13, 14 projecting radially inwardly from the inner face 12, the distance between the outer protective tube 8 and the outer face 17 of the inner protective tube 9 is greater than in the region of the wall portion 8' and especially in the region of the guiding webs 15.

The distance may vary, depending on production tolerances. However, it is the purpose of the guiding webs 15 to ensure that, under normal operating conditions, even with the smallest amount of play, only the guiding webs 15, by means of their end faces 18, come into contact with the outer face 17 of the inner tube 9. When load is applied from the outside, the ribs 13, 14 may also contact the outer face 17 of the inner protective tube 9.

It can be seen that the outer face of the outer protective tube 8 is substantially round. Thus, the outer surface does not provide a surface of engagement which would result in any clothing being wound up, nor does it constitute any other risk of injury.

Figure 3:
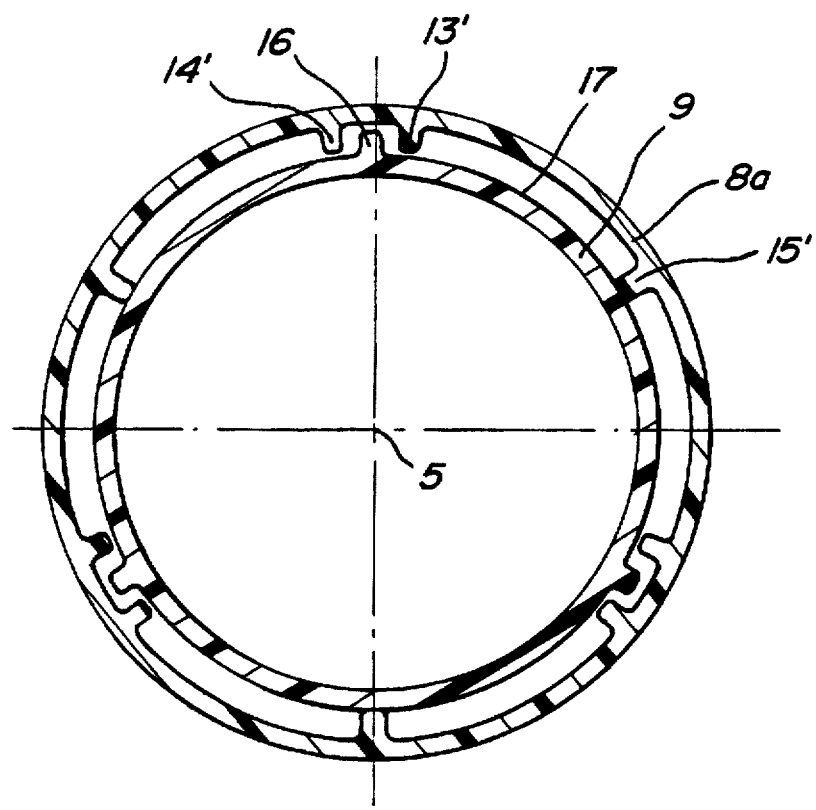
FIG. 3 is a cross-section view like FIG. 2 through a further embodiment.

FIG. 3 shows an embodiment wherein both the inner protective tube 9 and the outer protective tube 8a include substantially annular cross-sections. The design of the inner protective tube 9 corresponds to that of the inner protective tube according to FIG. 2. The outer protective tube 8a includes ribs 13', 14' which project towards the longitudinal axis 5 and whose length is shorter than that of the guiding webs 15'. In this way it is ensured that, in the case of minimum construction tolerances, only the guiding webs 15' come into contact with the outer face 17 of the inner protective tube 9.

While the above detailed description describes the preferred embodiment of the present invention, the invention is susceptible to modification, variation and alteration without deviating from the scope and fair meaning of the subjoined claims.

We claim:

1. A protective device for telescopic, rotating shafts comprising:

an outer protective tube and an inner protective tube which are axially inserted into, and overlap, one another, said tubes are adjustable relative to one another along a longitudinal axis and are made of plastic, said outer protective tube on an inner face including at least three grooves which are open towards the longitudinal axis and which are delimited by pairs of ribs on the outer protective tube, said pairs of ribs extend parallel to the longitudinal axis and project from the inner face, said pairs of ribs are arranged so as to be distributed on a circumference of the inner face around the longitudinal axis, the inner face of said outer protective tube between the pairs of ribs further including at least one guiding web formed on and projecting from the inner face towards the longitudinal axis and said inner protective tube including guiding ribs formed on and projecting radially outwardly from the outer face, said guiding ribs of said inner protective tube corresponding in number to the pairs of ribs of the outer protective tube, said guiding ribs of said inner protective tube are arranged to project between said ribs of respective said pair of ribs, said guiding ribs of said inner protective tube engage with play, in the circumferential direction, the region between said pairs of ribs.

2. A protective device according to claim 1, wherein the inner protective tube, with the exception of the guiding ribs projecting therefrom, has an annular cross-section.

3. A protective device according to claim 2, where the outer protective tube, with the exception of the ribs of said pairs of ribs and guiding webs, has an annular cross-section and the guiding webs are longer in the radial direction than the ribs.

4. A protective device according to claim 2, wherein in the region of the pairs of ribs of the outer protective tube, a distance between the inner face of the outer protective tube and the outer face of the inner protective tube is greater than the distance between the inner face of the outer protective tube and the outer face of the inner protective tube in the region of the guiding webs, such that a wall portion between the two pairs of ribs, includes an arched cross-section whose curvature is smaller than that of the wall portion in the region of the guiding rib.

5. A protective device according to claim 1, wherein the guiding webs, via their web ends, serve as spacers for the inner face of the outer protective tube relative to the outer face of the inner protective tube and for the end faces of the guiding ribs to the inner face portion of the outer protective tube between the two ribs of the respective pairs of ribs.

* * * * *